United States Patent [19]

Earnshaw

[11] Patent Number: 4,992,917
[45] Date of Patent: Feb. 12, 1991

[54] LIGHT REFLECTOR FOR GROWING PLANTS

[76] Inventor: John Earnshaw, 1103 Davie Street, Victoria, British Columbia, Canada, V8S 3E2

[21] Appl. No.: 434,248

[22] Filed: Nov. 13, 1989

Related U.S. Application Data

[63] Continuation-in-part of Ser. No. 253,823, Oct. 6, 1988, abandoned.

[51] Int. Cl.⁵ .............................................. F21V 7/00
[52] U.S. Cl. ............................ 362/346; 3262/352; 3262/360; 3262/806; 3262/373; 350/612
[58] Field of Search ............... 362/346, 352, 351, 360, 362/310, 277, 282, 373, 294, 805, 806, 296, 297, 298, 341; 350/612, 617; D26/85, 91

[56] References Cited

U.S. PATENT DOCUMENTS

| 780,043 | 1/1905 | Korff | 362/332 |
|---|---|---|---|
| 2,430,551 | 11/1947 | Arnold et al. | 350/617 |
| 3,451,881 | 6/1969 | Gurule | 428/542.2 |
| 4,314,280 | 2/1982 | Rose | 362/360 |
| 4,428,030 | 1/1984 | Baliozian | 262/18 |
| 4,616,293 | 10/1986 | Baliozian | 362/352 |
| 4,654,767 | 3/1987 | Yamdjuchi | 362/352 |

OTHER PUBLICATIONS

"Phototron" (TM) Advertisement Pyraponic Industries Inc., Penthouse Jan. 1990 Issue.

*Primary Examiner*—Stephen F. Husar
*Assistant Examiner*—D. M. Cox
*Attorney, Agent, or Firm*—Shlesinger & Myers

[57] ABSTRACT

A light reflector includes a plurality of opaque, generally triangular panels connected together to form a three dimensional geometric figure surrounding an inside space. Each panel has a reflective surface facing the inside space and each corner of each of the panels is adjacent a corner of an adjacent panel. The panels are spaced apart from each other by rectangular, open areas. An artifical light source is placed inside the inside space. The reflective surfaces relect light from the artificial light source and direct reflected light toward the rectangular open areas. Plants are situated adjacent the rectangular open areas and receive light emanating therefrom.

22 Claims, 5 Drawing Sheets

LIGHT REFLECTOR FOR GROWING PLANTS

CROSS REFERENCES TO RELATED APPLICATIONS

This is a continuation-in-part application of application Ser. No. 07/253,823 filed Oct. 6, 1988, now abandoned.

BACKGROUND OF THE INVENTION

This invention relates to reflectors used in conjunction with artificial light sources for growing plants.

Electric lights are commonly used indoors for hydroponic or soil-based growing of plants. One difficulty in using such artificial lighting for plants is assuring that a number of different plants receive equal lighting from the light source, particularly when a light bulb is used. It is likewise desirable to maximize the available light for growing purposes.

Another problem associated with growing plants under artificial lights is assuring adequate heat dissipation, particularly when high power light bulbs are used.

SUMMARY OF THE INVENTION

The invention provides a light reflector comprising a plurality of opaque, generally triangular panels connected together to form a three dimensional geometric figure surrounding an inside space. Each of the panels has a reflective surface facing the inside space and each corner of each of the panels is adjacent to a corner of an adjacent the panel. The panels are spaced apart from each other by rectangular, open areas.

In a preferred form of the invention, the panels are triangular and the open areas are square. For example, there may be eight triangular panels.

In another form, the invention provides a plurality of generally triangular panels, each panel having a first reflective surface and a second surface parallel to the first surface and spaced apart therefrom, the second surface being slightly larger than the first surface. Each panel has truncated corner portions and tapered edges on the truncated corner portions. Each panel also has tapered edges between the sides of the first and second surfaces. The light reflector also has connecting means for connecting adjacent panels together to form a three dimensional figure surrounding an inside space, the adjacent panels having rectangular open areas therebetween and, the reflective surfaces of the panels facing toward the inside space.

In another form, the invention provides an interior framework and an exterior framework slightly larger than the interior framework. Each framework has a plurality of triangular portions connected to each other with corner portions thereof adjacent each other and sides thereof spaced apart by rectangular portions. The triangular and rectangular portions of the interior and exterior frameworks are parallel to each other and are spaced apart. The triangular portions of the interior framework are covered with a reflective material to form generally triangular panels.

DESCRIPTION OF THE PREFERRED EMBODIMENTS

Figure 1:
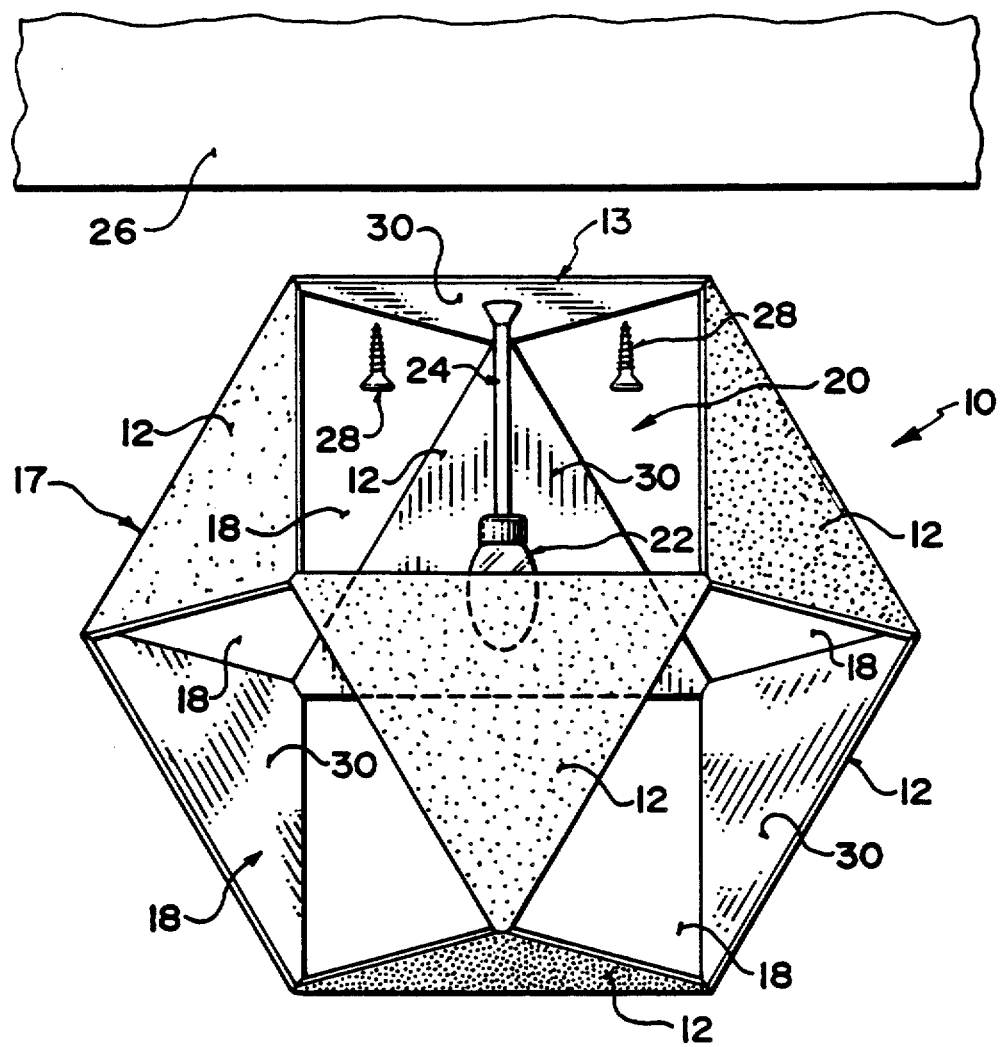
FIG. 1 is a side, perspective view of a light reflector for growing plants according to a first embodiment of the invention.

Referring to FIG. 1, a light reflector for growing plants, according to a first embodiment of the invention is shown generally at 10. Reflector 10 is comprised of a plurality of opaque, generally triangular panels 12 which, in this embodiment, are plywood panels in the shape of equilateral triangles. In one example, the triangles have a height of approximately 60 cm. The triangles can all be cut from a single sheet of plywood.

Figure 2:
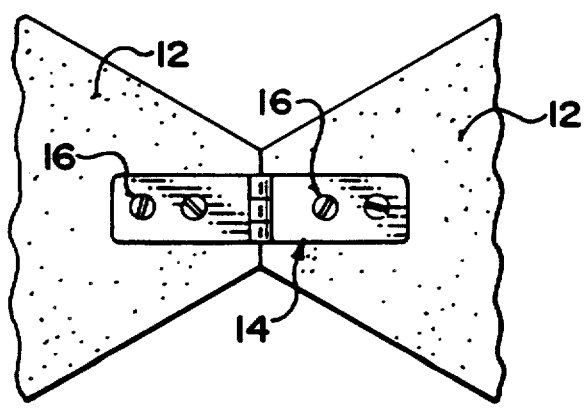
FIG. 2 is a fragmentary interior view of the reflector of FIG. 1 showing the connection between adjacent panels.

As may be seen in FIG. 2, the corners of the triangles are cut off to permit them to be connected together by metal straps 14. Screws 16 are used in this example to connect the metal straps to each adjacent panel. Referring back to FIG. 1, the panels are connected together such that each corner of each of the panels is adjacent a corner of an adjacent panel. The panels so connected form a three dimensional geometric FIG. 17 surrounding an inside space 20. The panels are spaced apart from each other by rectangular open areas 18 defined by the sides of the panels. The three-dimensional figure formed has eight triangular sides which are spaced-apart by six open rectangular areas 18.

The inside space or interior 20 has an artificial light source located therein, in this case a HID light source 22. The light source 22 is located near the centre of the figure and is connected to a top panel 13 by a depending shaft 24. The top panel is connected to, for example, ceiling joist 26 by a plurality of screws 28. Each of the panels 12 has a reflective surface. In this embodiment, each of the panels has a diffusing reflective foil coating 30 on the surface facing the interior 20.

Figure 3:
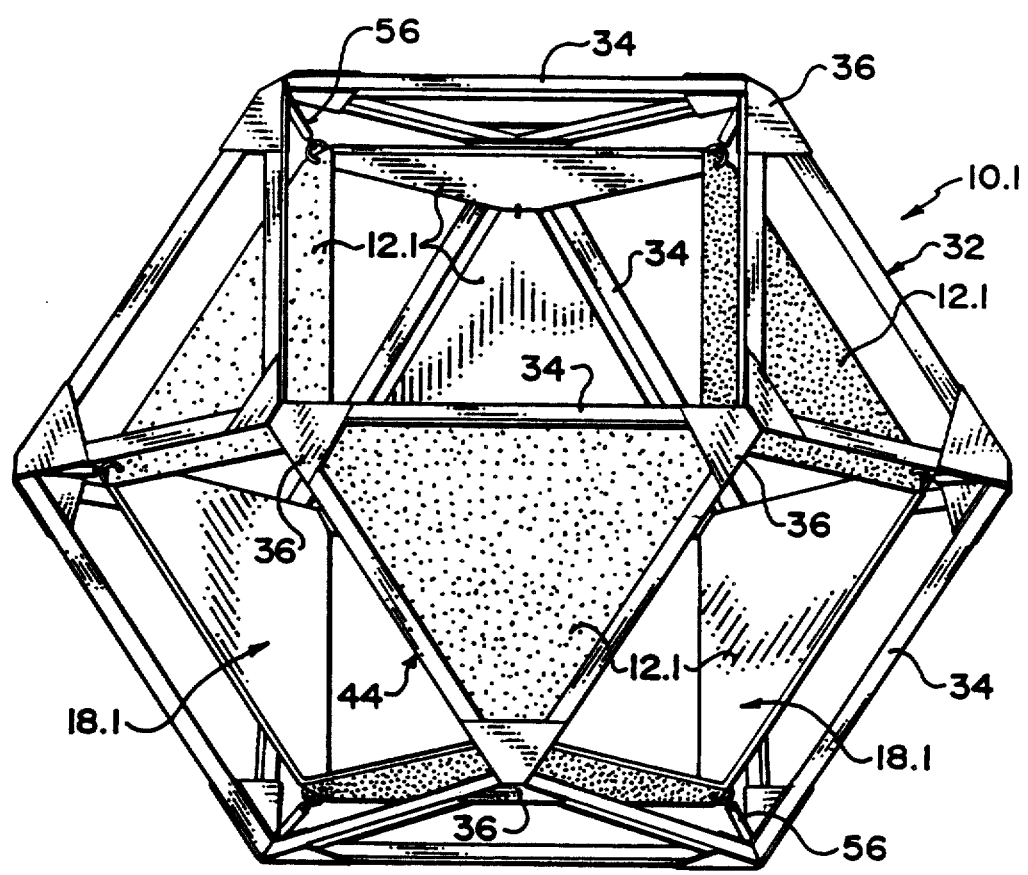
FIG. 3 is a side, perspective view of a light reflector for growing plants according to a second embodiment of the invention and incorporating an exterior framework.

Referring to FIG. 3, a light reflector according to a second embodiment of the invention is shown generally at 10.1 and is generally similar to the reflector 10 described above. In this figure like parts have like numbers with the additional designation of "0.1". In this embodiment, the panels 12.1 are lighter which is made possible by the use of an exterior supporting framework 32.

Figure 4:
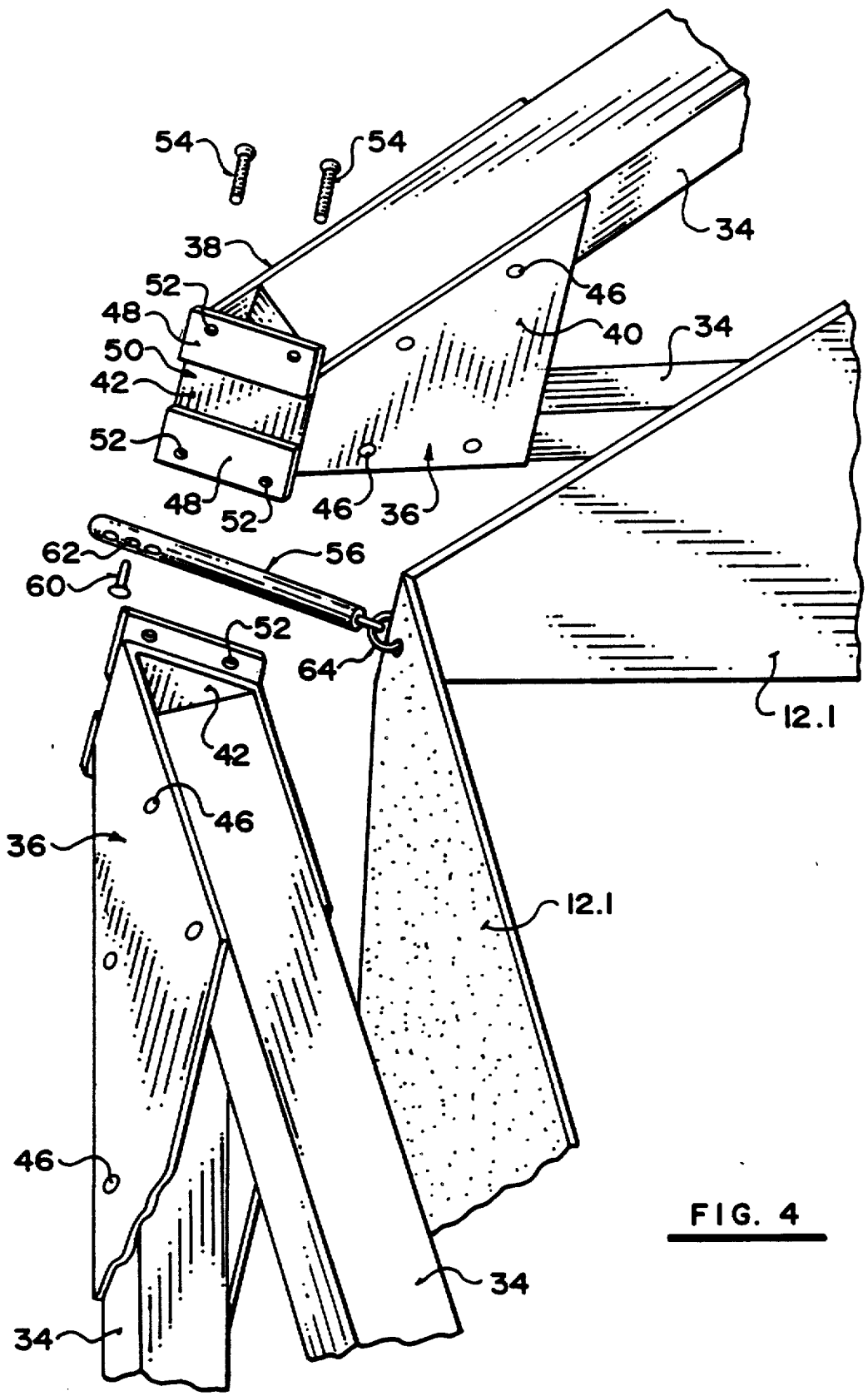
FIG. 4 is a fragmentary, exploded view of the connections between members of the exterior frame and the reflector for the embodiment of FIG. 2.

The framework is made from a plurality of rod-like members 34. In this embodiment, the rod-like members are made of wood approximately 4 cm square in section. The members 34 are interconnected at their ends by connectors 36, two of which are shown in FIG. 4. Each connector is U-shaped and has two trapezoidal portions 38 and 40 interconnected by a rectangular portion 42. Triangular frame portions, such as portion 44 in FIG. 3, are formed utilizing one connector 36 at each corner to connect together two of the members 34. Nails 46 or other connectors such as screws are used to secure the connectors to the members. Eight of the triangular portions 44 are connected together to form the framework 32.

Shims 48 are connected to each side of rectangular portion 42 of the connectors 36 and are separated by a channel 50. A pair of apertures 52 on each of the shims 48 allows connectors such as bolts 54 to connect the connectors together and thus connect portions 44 together to form the framework 32. The portions 42 of each connector 36 are angled so portions 42 of adjacent connectors are flat against each other when the framework is formed.

A resilient strap 56, of rubber or other flexible material, is fitted between each adjacent pair of connectors and is located within the channels 50 between the shims 48. A pin 60 extends through one of a plurality of apertures 62 in the strap 56 and is inserted into the rectangular portion 42 of one of the connectors. Thus, the strap is secured between the connectors when they are secured together. A ring 64 is connected to the end of each strap 56 opposite the apertures 62. Ring 64 is inserted through small apertures in adjacent reflective panels 12.1 as seen in FIG. 4. Thus the straps are used to connect the framework to the reflective panels.

The reflective panels in this embodiment may be of lighter construction because of the use of the exterior supporting framework 32. In this embodiment, the triangular panels 12.1 are made of plywood approximately 3 mm thick and have a vinyl coating on their exterior surface with a reflective diffusing foil glued to the inside surface.

Figure 5:
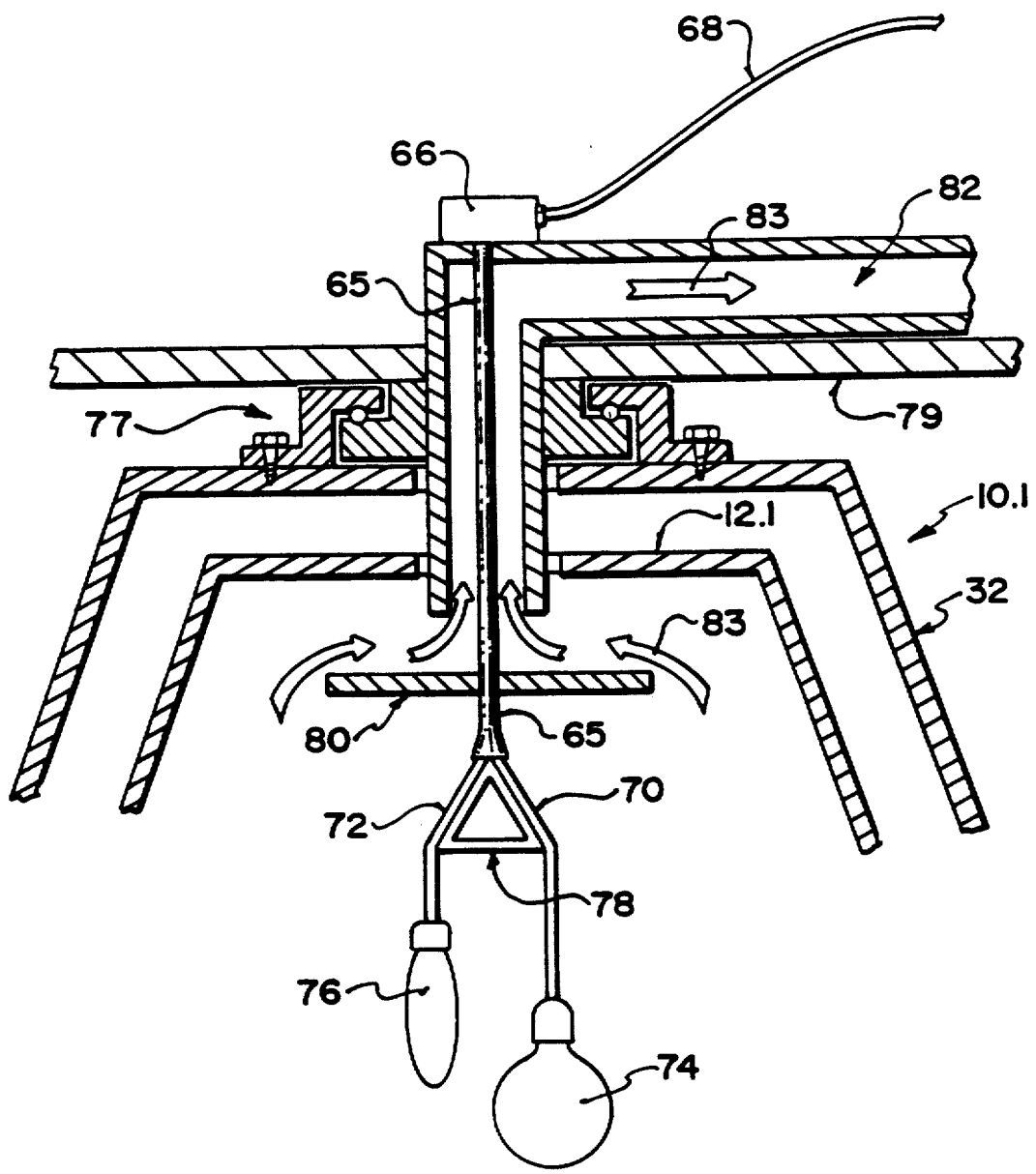
FIG. 5 is a partly sectional side elevation showing the light source for the reflector of FIG. 2, a portion of the ceiling and a top portion of the reflector.

FIG. 5 shows a light source used with the embodiment of FIGS. 3 and 4. This figure shows only a top portion of the reflector 10.1. Tube 65 extends downwardly from a conventional ceiling outlet box 66 supplied with electric current from a cable 68. A pair of electrical cords 70 and 72 extend downwardly from the outlet box through the tube 65. A metal halide bulb 74 is connected to the bottom end of cord 70, while a high pressure sodium light bulb 76 is located on the bottom end of cord 72. A yoke 78 is used to hold the bulbs apart.

In the illustrated embodiment, metal halide light 74 is 1 kilowatt, while the high pressure sodium bulb 76 is 0.5 kilowatts. The resulting light intensity at the square, open areas 18.1 of this embodiment is in the order of 3,000–5,000 foot candles which approaches the intensity of the sun which varies between 5,000–10,000 foot candles.

A turntable 77 connects the top portion of the frame 32 to an adjacent support 79 thus permitting reflector 10.1 to rotate about the two light bulbs. The turntable is preferably equipped with a motor. Plants may be attached to the framework 32 and rotate therewith to give the plants a better, more even and naturally fluctuating light exposure.

A duct 82 is located above the reflector and communicates rotatably with the interior of the reflector 10.1. This allows cooling air 83 to be drawn through the reflector. A secondary reflector 80 is connected to the tube 65 and reflects light from the bulbs 74 and 76 downward toward the centre of the interior. The secondary reflector also acts as a deflector so that cooling air is drawn from the inside space adjacent the panels. An air flow of approximately 60 cubic feet per minute is used in one example.

When either reflector 10 or 10.1 is used, the plants are positioned outside the square areas 18 or 18.1 to receive the required light. Extensive pruning is desirable to remove leaves outside the square area and leaves which face away from the light source. The backs of the leaves are thus facing away from the light source to allow dissipation of heat therefrom.

The reflector 10.1 is preferred because framework 32 allows trellising of plants so their stems are held away from the square areas. Otherwise the leaves tend to grow inside the opening where they get reflection from all directions, whereas it is desirable to have the light come from one direction only.

Figure 6:
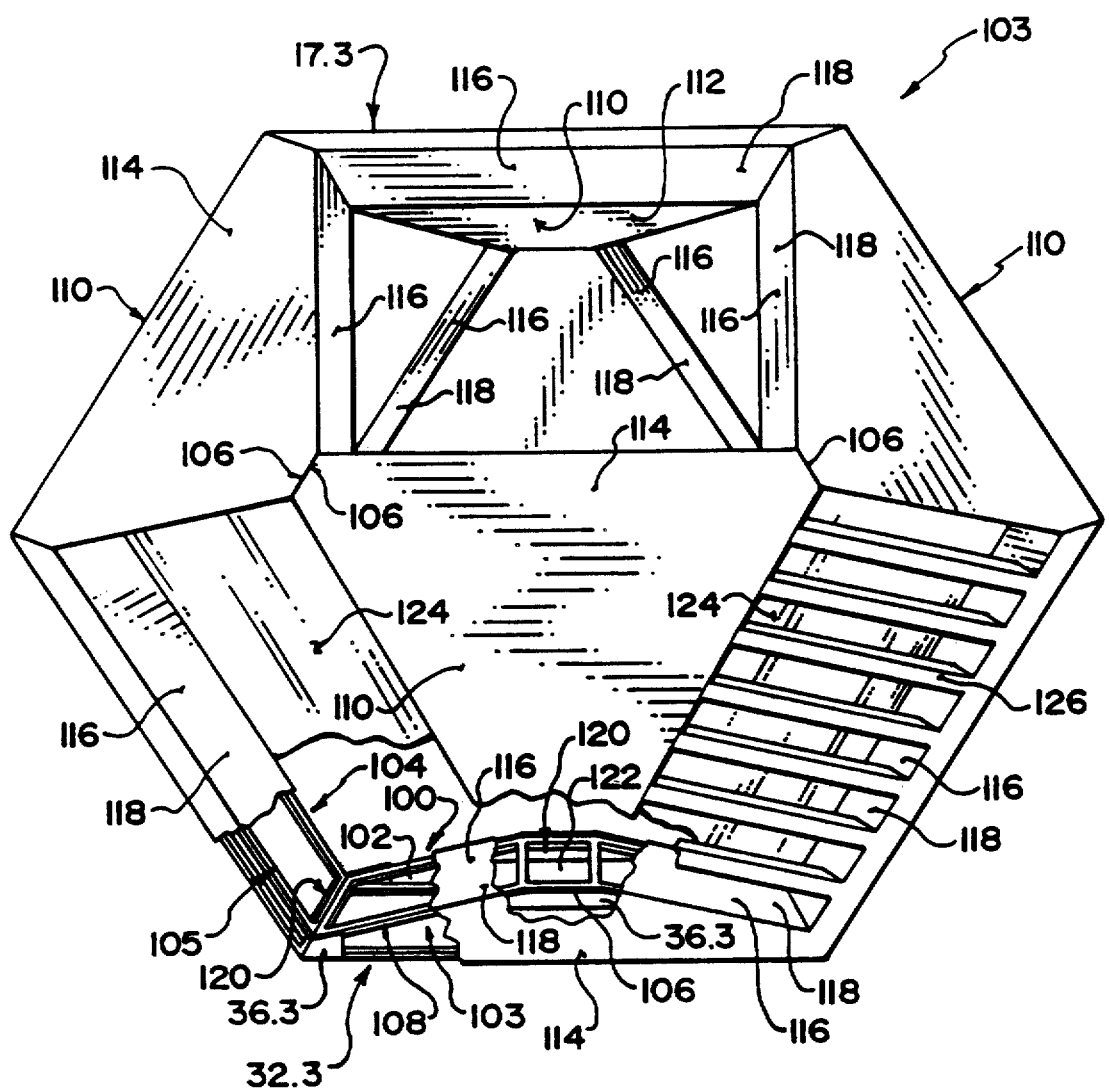
FIG. 6 is a side, partly broken perspective view of a light reflector according to a third embodiment of the invention incorporating interior and exterior frameworks.

Referring to FIG. 6, a light reflector according to a third embodiment of the invention is shown generally at 10.3. In FIG. 6, parts similar to those of the first or second embodiments have similar reference numbers with the additional designation of "0.3".

The light reflector 10.3 includes an interior framework shown generally at 100 surrounding the inside space 20.3. A slightly larger exterior framework shown generally at 32.3 surrounds the interior framework. The interior and exterior frameworks have a plurality of generally triangular portions 102, 103 respectively which are connected to panels of the same framework at their corners and which are spaced apart from other panels of the same framework by rectangular portions 104, 105 respectively.

With regard to exterior framework 32.3, each of the triangular portions 103 is formed by three rod-like members arranged in a generally triangular shape and interconnected at their ends by connectors similar to those illustrated in FIG. 4. The three members are connected together to form the triangular portions as shown such that the triangular portions have three truncated corner portions 106. The connectors 36.3 form the truncated corner portions while the three members form sides 108. The three truncated corner portions 106 are connected to a respective three truncated corner portions of three respective adjacent triangular portions of the same framework to form the three dimensional geometric FIG. 17.3. The corner portions of adjacent triangular portions are thus adjacent each other. The sides 108 of the triangular portions 102 act as the sides of the rectangular portions 105 which space the triangular portions apart. The construction of the interior framework is similar.

The exterior framework 32.3 is aligned with the interior framework 100 such that the triangular and rectangular portions 103, 105 of the exterior framework are in parallel alignment with corresponding triangular and rectangular portions 102, 104 of the interior framework. The triangular and rectangular portions 103, 105 of the exterior framework are, of course, spaced apart from corresponding triangular and rectangular portions 102, 104 of the interior framework due to relative sizes of the frameworks.

In the embodiment shown, portions of metallic reflective foil material are secured to the triangular portions and extend between the sides of respective triangular portions 102 of the interior framework thereby forming a plurality of generally triangular panels 110. Each panel thus has a first reflective surface 112 facing the inside space 20.3. Portions of opaque, non-porous material are secured over the exterior triangular portions 103 and act as respective second surfaces 114 of the generally triangular panels.

The portions of reflective material forming the first surfaces 112 have three outwardly extending reflective side portions 116 which are folded outward, toward the exterior framework 32.3 and which are secured to the exterior framework. The reflective side portions 116 thus extend between corresponding triangular portions 102, 103 of the interior and exterior frameworks 100 and 32.2 to form tapered edges 118 between the sides of the first and second surfaces, the edges being tapered due to the relative sizes of the frameworks. The panel 110 thus formed has truncated corner portions 120 by virtue of the truncated corner portions 106 of the triangular portions 102, 103 of the interior and exterior frameworks 100 and 32.3.

The truncated corner portions 120 are tapered but are uncovered and therefore act as openings 122 to allow the passage of air from the corner of one panel to the corner of an adjacent panel. As described above, the triangular portions 102 of the interior framework 100 are covered, the tapered edges 118 of the panels 110 are formed by reflective material and are thus covered and the triangular portions 103 of the exterior framework 32.3 are covered with an opaque, non-porous material, thus the panels are hollow. Consequently, the panels can act as ducts permitting air to be circulated within the panels and permit air to pass between the panels via the openings 122 in the truncated corner portions 120.

In this embodiment, the rectangular portions 104 of the interior framework 100 are covered with a translucent matte material 124 extending between the sides of adjacent triangular panels 100. This has the effect of diffusing the light emanating from the inside space and distributes the light more evenly to plants adjacent the rectangular portions. In addition the leaves of plants are prevented by the material 124 from entering the inside space, possibly being burned by the light source and reducing the overall light intensity to other plants. The rectangular portions 105 of the exterior framework 32.3 have respective trellises 126 mounted thereto. Plants may be trained to climb respective trellises while being exposed to diffused light emanating from the translucent covering 124 on the adjacent rectangular portion 104 of the interior framework 100.

It will be appreciated that the three dimensional geometric figure is a closed figure due to the various coverings over the triangular and rectangular portions. This prevents insects from venturing near and possibly fouling the light source. This has a particular advantage in that when the reflector is used in a greenhouse environment, it enables parasitic wasps to be used to control whitefly. Parasitic wasps normally have a tendency to fly into the light source however, the covered reflector prevents this from happening.

In addition to the above, the closed figure separates hot air heated by the light source in the inside space from cooler air situated outside the reflector, the cool air being the environment in which plants grow best. The risk of burning plants is thus considerably reduced.

As stated above, the panels 110 are hollow and have openings 122 in their truncated corner portions 120. While it has already been explained that air may be circulated around the device using the panels as ducts, it will be appreciated that the ducts may alternatively or simultaneously be used for other purposes such as to conceal wiring or plumbing or to house devices such as pumps, motors, sensors or controls.

While specific embodiments of the invention have been described and illustrated, such embodiments should be considered illustrative of the invention only and not as limiting the scope of the invention as construed in accordance with the accompanying claims.

What is claimed is:

1. A light reflector comprising:
a plurality of opaque, generally triangular panels having three sides of equal length, the panels being connected together to form a three-dimensional geometric figure surrounding an inside space, each said panel having a reflective surface facing said inside space, each corner of each of said panels being adjacent a corner of an adjacent said panel and said panels being spaced apart from each other by rectangular, open areas.

2. A light reflector as claimed in claim 1 further including connectors cooperating with the corners of the panels to connect the panels together.

3. A light reflector as claimed in claim 1 wherein the reflective surface includes a matallic coating.

4. A light reflector as claimed in claim 1 wherein there are eight said panels.

5. A light reflector as claimed in claim 1 further including a cooling air duct connected to the reflector.

6. A light reflector as claimed in claim 1 further including an artificial light source in said inside space.

7. A light reflector comprising:
(a) a plurality of generally triangular panels, each said panel having a first reflective surface and a second surface parallel to said first surface and spaced apart from said first surface, said second surface being slightly larger than said first surface, each said panel having truncated corner portions, and tapered edges on the truncated corner portions and tapered edges between the sides of the first and second surfaces; and
(b) connecting means for connecting adjacent said panels together to form a three dimensional figure surrounding an inside space, adjacent said panels having rectangular open areas therebetween, the reflective surfaces of the panels facing toward the inside space.

8. A light reflector as claimed in claim 7 wherein the tapered edges extending between the sides of each panel have a reflective material thereon.

9. A light reflector as claimed in claim 8 further including a trellis covering one of said rectangular open areas, the trellis being connected between the sides of adjacent said panels surrounding the open area.

10. A light reflector as claimed in claim 7 wherein the panels are hollow and each said tapered edge on each said truncated corner has an opening for passage of air therethrough.

11. A light reflector as claimed in claim 7 wherein the second surface is opaque.

12. A light reflector as claimed in claim 7 further including a translucent matte cover for covering one of said rectangular open areas, the cover being connected between the sides of adjacent said panels surrounding said one rectangular open area.

13. A light reflector comprising:
an interior framework and an exterior framework slightly larger than said interior framework, each said framework having a plurality of triangular portions connected to each other with corner portions thereof adjacent each other and sides thereof spaced apart by rectangular portions, the triangular and rectangular portions of the interior and exterior frameworks being parallel to each other and spaced apart, the triangular portions of the interior framework being covered with a reflective material to form generally triangular panels.

14. A light reflector as claimed in claim 13 wherein the reflective material extends between respective sides of the triangular portions of the interior framework to corresponding respective sides of the triangular portions of the exterior framework.

15. A light reflector as claimed in claim 13 wherein at least one triangular portion of the interior framework is covered with a translucent matte material.

16. A light reflector as claimed in claim 13 wherein at least one rectangular portion of the interior framework is covered with a translucent matte material.

17. A light reflector as claimed in claim 13 wherein at least one rectangular portion of the exterior framework is covered with a trellis.

18. A light reflector comprising:
a plurality of opaque, generally triangular panels connected to an exterior framework, the panels being inside the framework and connected together to form a three-dimensional geometric figure surrounding an inside space, each said panel having a reflective surface facing said inside space, each corner of each of said panels being adjacent a corner of an adjacent said panel and said panels being spaced apart from each other by rectangular, open areas.

19. A light reflector as claimed in claim 18 wherein each said panel has three sides of equal length.

20. A light reflector as claimed in claim 18 wherein the framework includes a plurality of rod-like members interconnected at ends thereof.

21. A light reflector as claimed in claim 20, further comprising resilient members connecting the panels to the framework.

22. A light reflector as claimed in claim 18, further including a turn-table connected to the framework for rotatable mounting thereof.

* * * * *